(12) United States Patent
James

(10) Patent No.: US 8,087,683 B2
(45) Date of Patent: Jan. 3, 2012

(54) BICYCLE TRAILER AND HAND CART MOBILE TRANSPORT

(76) Inventor: Daryl I. James, Willingboro, NJ (US)

( * ) Notice: Subject to any disclaimer, the term of this patent is extended or adjusted under 35 U.S.C. 154(b) by 195 days.

(21) Appl. No.: 12/658,801

(22) Filed: Feb. 16, 2010

(65) Prior Publication Data

US 2011/0198825 A1    Aug. 18, 2011

(51) Int. Cl.
   B62K 27/00    (2006.01)
   B62D 63/06    (2006.01)
   B62D 63/08    (2006.01)
(52) U.S. Cl. ............ 280/204; 280/47.131; 280/656; 280/32.7; 280/416; 280/43.24
(58) Field of Classification Search .......... 280/47.131, 280/656, 204, 209, 30, 32.7, 292, 293, 416, 280/33.992, 43.1, 43.24, 47.15, 47.18, 47.24
See application file for complete search history.

(56) References Cited

U.S. PATENT DOCUMENTS

| | | | | |
|---|---|---|---|---|
| 1,375,459 A * | 4/1921 | Hesse | ................. | 280/7.16 |
| 5,098,113 A * | 3/1992 | Albitre | ................. | 280/204 |
| 5,301,963 A * | 4/1994 | Chen | ................. | 280/30 |
| 5,388,850 A * | 2/1995 | Simone | ................. | 280/442 |
| 5,435,582 A * | 7/1995 | Davidson | ................. | 280/33.992 |
| 5,454,577 A * | 10/1995 | Bell | ................. | 280/204 |
| 5,470,088 A * | 11/1995 | Adams | ................. | 280/204 |
| 5,641,173 A * | 6/1997 | Cobb, Jr. | ................. | 280/204 |
| 5,785,335 A * | 7/1998 | George | ................. | 280/204 |
| 5,836,600 A * | 11/1998 | Chiu | ................. | 280/231 |
| 6,341,791 B1 * | 1/2002 | Cannon, Sr. | ................. | 280/204 |
| 6,644,674 B2 * | 11/2003 | Simard | ................. | 280/33.991 |
| 7,172,206 B2 * | 2/2007 | Staszak | ................. | 280/204 |
| 7,300,062 B2 * | 11/2007 | Otterlee et al. | ................. | 280/33.992 |
| 7,845,664 B2 * | 12/2010 | Rodgers | ................. | 280/204 |
| 2001/0038190 A1 * | 11/2001 | Provencher | ................. | 280/281.1 |
| 2003/0011170 A1 * | 1/2003 | Humes | ................. | 280/504 |
| 2003/0127835 A1 * | 7/2003 | Shapiro | ................. | 280/656 |
| 2009/0256329 A1 * | 10/2009 | Sather | ................. | 280/204 |
| 2010/0133784 A1 * | 6/2010 | Shalaby et al. | ................. | 280/482 |

* cited by examiner

*Primary Examiner* — John R Olszewski
(74) *Attorney, Agent, or Firm* — Stuart M. Goldstein

(57) ABSTRACT

A mobile transport has a frame on which two wheels are mounted. A basket type container is permanently affixed to a portion of the frame, which also includes a foot rest section for child passengers. A receptacle post is provided which can support either a bicycle type seat for transporting a child or a container which doubles the carrying capacity of the transport. The frame of the transport also includes a frame extension, removeably attached to the frame, with a towing hitch for connection to a bicycle. Upon removal of the frame extension, the transport can be used as a manual cart, with the upper end of the frame providing the handle for pushing or pulling the cart.

9 Claims, 4 Drawing Sheets

BICYCLE TRAILER AND HAND CART MOBILE TRANSPORT

BACKGROUND OF THE INVENTION

Trailers which are to be towed behind bicycles are commonly utilized for both transporting children and hauling miscellaneous items such as packages, tools, equipment, and the like. These trailers are most often removeably hitched to the bicycle for use as needed. Manually pulled or pushed hand carts are also prevalent for carrying packages, bags and other items. However, there is currently no mobile transport device which integrates and improves upon the features of a bicycle trailer and those of a manual hand cart to provide one highly versatile vehicular device.

SUMMARY OF THE INVENTION

It is thus the object of the present invention to provide a mobile transport which has the versatility not only to be towed by a bicycle as a trailer to carry children and miscellaneous items, but also which is to be utilized as a hand cart with one or more baskets or containers for carrying items.

It is the object of the present invention to provide a mobile transport which can specifically be towed behind a bicycle to transport children and carry miscellaneous items.

It is another object of the present invention to provide a mobile transport which can be towed behind a bicycle and has a plurality of baskets or containers for carrying an even greater number of items.

It is a further object of the present invention to provide a mobile transport which can quickly and easily be converted to a manually operated hand cart for carrying miscellaneous items and/or transporting a child.

It is the object of the present invention to provide a mobile transport which is generally convertible to a number of different modes by quickly and easily disconnecting or interchanging components.

These and other objects are accomplished by the present invention, a mobile transport having a frame on which two wheels are mounted. A basket type container is permanently affixed to a portion of the frame, which also includes a foot rest section for child passengers. A receptacle post is provided which can support either a bicycle type seat for transporting a child or a container which doubles the carrying capacity of the transport. The frame of the transport also includes a frame extension, removeably attached to the frame, with a towing hitch for connection to a bicycle. Upon removal of the frame extension, the transport can be used as a manual cart, with the upper end of the frame providing the handle for pushing or pulling the cart.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
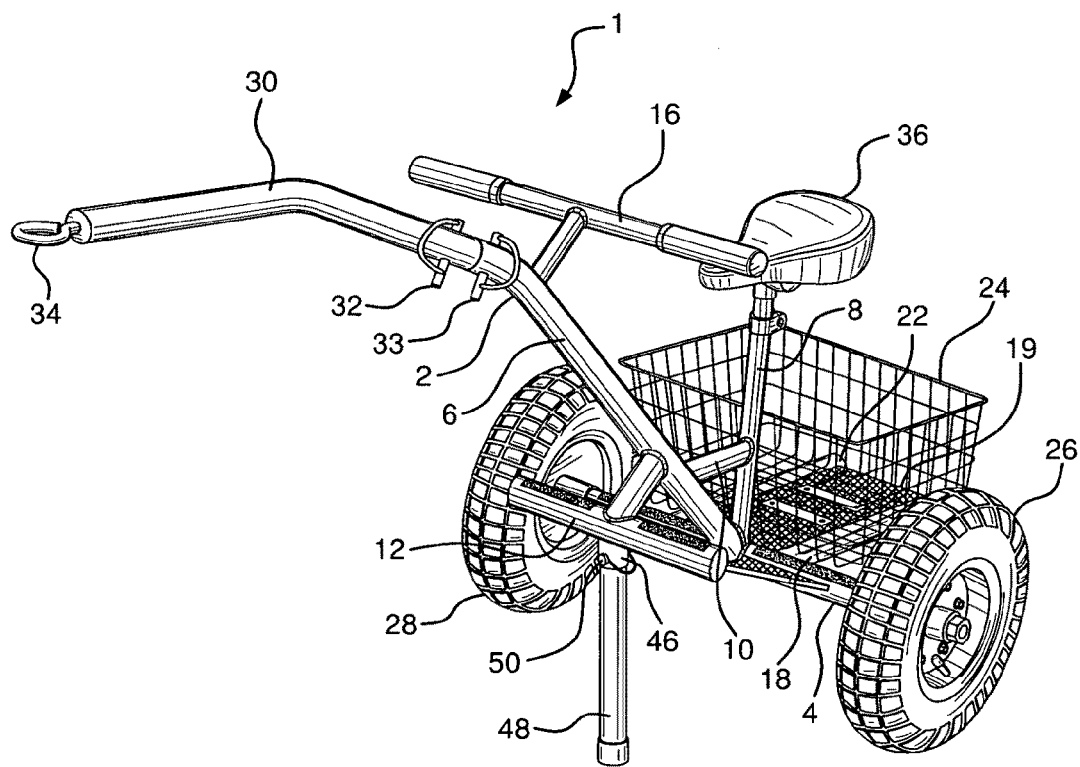
FIG. 1 is an isometric view of the mobile transport of the present invention in towing configuration with one basket container and a seat attached.
Figure 2:
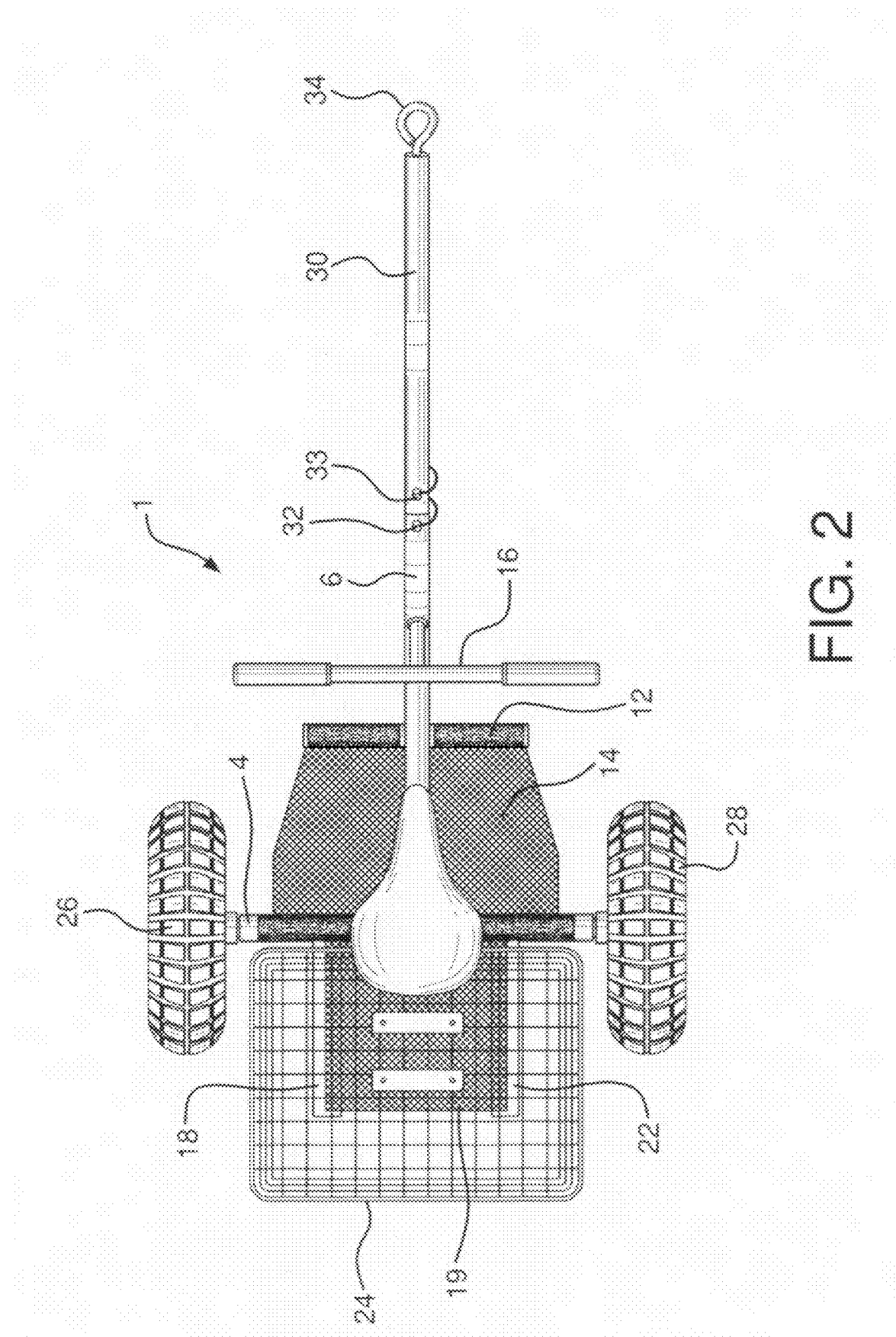
FIG. 2 is a top view of the mobile transport of the present invention shown in FIG. 1.
Figure 3:
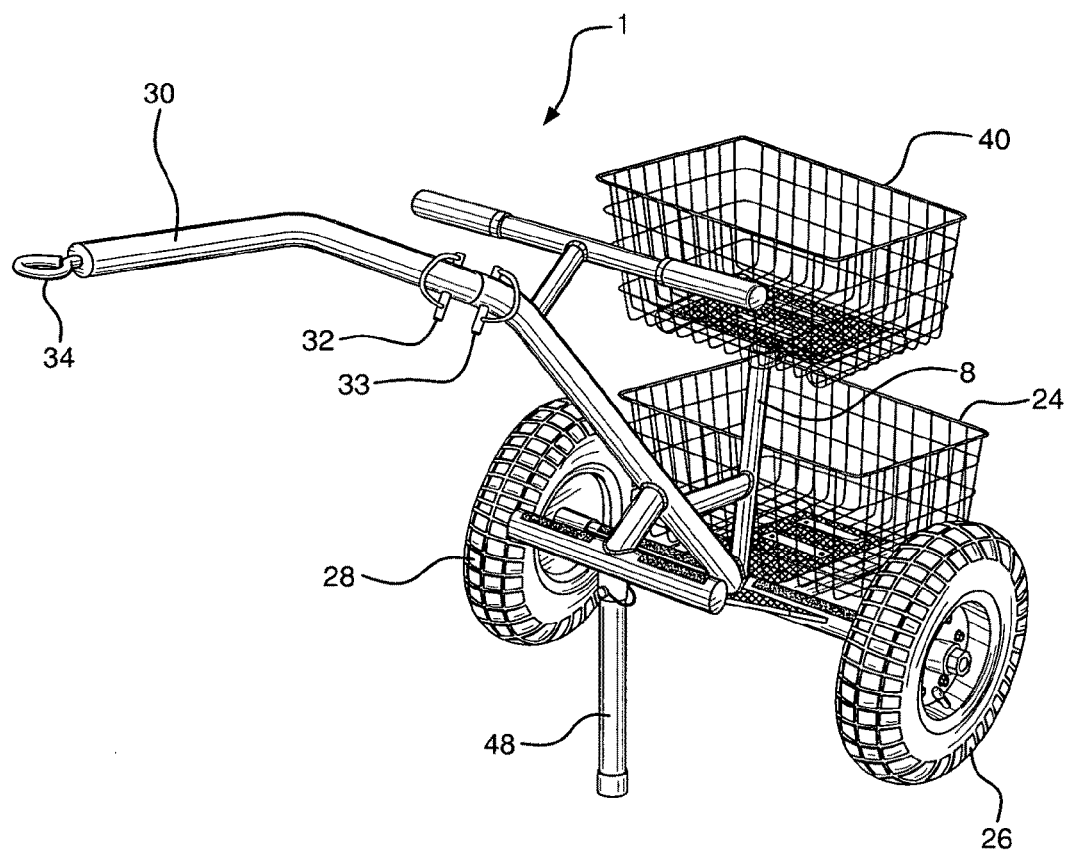
FIG. 3 is a isometric view of the mobile transport of the present invention in towing configuration with two basket containers attached.
Figure 4:
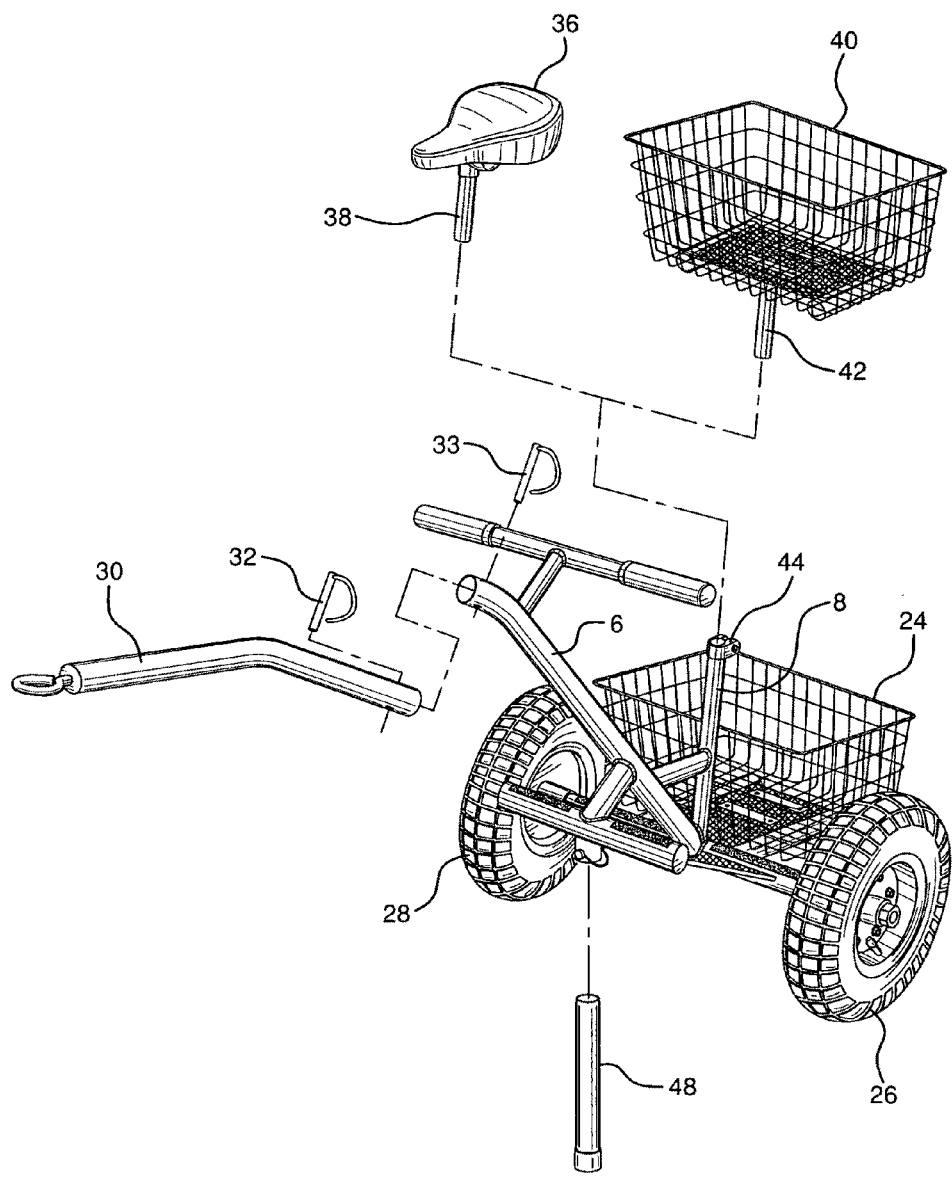
FIG. 4 is an exploded view of the mobile transport of the present invention showing the availability of all components of the invention.

Mobile transport 1 of the present invention comprises frame 2 having horizontal cross member 4 and oblique member 6. Post receptacle 8 extends vertically upward from cross member 4. It is additionally supported by auxiliary cross member 10 extending between the post receptacle and oblique member 4. Footrest member 12 extends from oblique member 4 near its lower end. Footrest platform 14 extends between cross member 4 and footrest member 12. Handle bar member 16 extends from near the upper end of oblique member 4.

Frame 2 also comprises container support members 18 and 20 which extend rearwardly from cross member 4. Container support platform 19 is secured between support members 18 and 20. Basket type container 24 is permanently affixed to support platform 22 by welding, screw maintained brackets, or equivalent attachment means.

An axle (not shown) runs through cross member 4 and is rotatably connected to wheels 26 and 28.

The upper end of oblique member 6 is open so that frame extension 30 can be inserted therein. Once within the upper end of oblique member 4, frame extension 30 is detachably connected to the oblique member by biasedly loaded spring clip 32. Towing hitch 34 extends from the end of frame extension 30. Biasedly loaded spring clip 33 is provided through opposing holes in oblique member 6, for use as a spare clip and to secure items in container 24.

Receptacle post 8 is tubular in nature and opened to accept either seat post 38 of bicycle type seat 36 or container post 42 of basket type container 40. Manually operable tension clamp 44 secures seat post 38 or container post 40 within receptacle post 8, at heights convenient to the user.

The versatility of mobile transport 1 is thus quite evident. With frame extension 30 secured within oblique member 6, seat post 38 is inserted and tightened within receptacle post 8 with tension clamp 44. A person, most likely a child, can then sit on seat 36, with his or her feet on foot rest member 12 or foot rest platform 14, as it is towed behind a bicycle, via towing hitch 34. Container 24 is also available for the placement and carriage of packages, books, toys, or other miscellaneous items.

With seat 36 and its post 38 removed from receptacle post 8, container post 42 of container 40 can then be inserted and tightened within the receptacle post with tension clamp 44. This results in transport 1 having two basket type containers 24 and 40 available for the placement and carriage of items, as the transport is being towed via towing hitch 34.

When spring clip 32 is detached and frame extension 30 removed from oblique member 6, the end of the oblique member can be used as a handle to manually push or pull transport 1, with both containers 24 and 40 attached or container 24 and seat 36 attached.

Open ended, short tubular member 46 extends down from foot rest member 12. Transport stand 48 is insertable into tubular member 46 to maintain transport 1 upright, stable and balanced when it is stationary. Stand 48 is removeably connected by biasedly loaded spring clip 50. When not being used, stand 48 can be attached to one of the two basket containers 24 and 40 by means of spring clip 50.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A mobile transport to be towed by a bicycle as a trailer and to be utilized as a hand cart, said transport comprising:
   a frame on which a plurality of wheels is mounted;
   container means permanently mounted on the frame for carrying miscellaneous items;
   second container means removeably mounted over the frame for carrying additional miscellaneous items;
   a bicycle type seat;
   tubular receptacle means extending upwardly from the frame for interchangeably receiving and supporting the seat and for supporting the second container means, whereby when the receptacle means supports the seat, the transport is configured to carry a person and when the receptacle means supports the second container means, the transport is configured to carry additional miscellaneous items;
   handle bars extending from the frame to be grasped by a person to be transported on said seat; and
   frame extension means removeably connected to the frame for attaching the frame to a bicycle, whereby when the frame is so attached, the transport is configured to be towed as a bicycle trailer and when the frame is disconnected from the frame extension means, the transport is configured to be used as a hand cart.

2. The mobile transport as in claim 1 further comprising foot rests extending from the frame for the placement of feet of a person being carried on the transport.

3. The mobile transport as in claim 1 further comprising removeable connection means for attaching the frame to the frame extension means.

4. The mobile transport as in claim 1 further comprising attachment means on the tubular receptacle means for removeably connecting the seat to the tubular receptacle means and the second container means to the tubular receptacle means.

5. The mobile transport as in claim 1 further comprising removeable transport stand means for supporting the transport when it is stationary.

6. The mobile transport as in claim 5 wherein the stand means is removeably connected to a foot rest extending from the frame.

7. The mobile transport as in claim 1 wherein the container means and the second container means comprise wire baskets.

8. The mobile transport as in claim 1 wherein two wheels are mounted to the frame.

9. The mobile transport as in claim 1 wherein a towing hitch extends from the frame extension means for connection to a bicycle.

\* \* \* \* \*